(12) United States Patent
Wizon et al.

(10) Patent No.: US 7,430,532 B2
(45) Date of Patent: Sep. 30, 2008

(54) SYSTEM AND METHOD FOR TRADE ENTRY

(75) Inventors: Adam Wizon, New Providence, NJ (US); Joseph M. Kochansky, New York, NY (US)

(73) Assignee: Blackrock Financial Management, Inc., New York, NY (US)

(*) Notice: Subject to any disclaimer, the term of this patent is extended or adjusted under 35 U.S.C. 154(b) by 670 days.

(21) Appl. No.: 10/167,354

(22) Filed: Jun. 11, 2002

(65) Prior Publication Data

US 2002/0188544 A1 Dec. 12, 2002

Related U.S. Application Data

(60) Provisional application No. 60/297,519, filed on Jun. 12, 2001.

(51) Int. Cl.
*G06Q 40/00* (2006.01)

(52) U.S. Cl. .................................................. 705/36 R

(58) Field of Classification Search ................ 705/36 R
See application file for complete search history.

(56) References Cited

U.S. PATENT DOCUMENTS

| | | | | |
|---|---|---|---|---|
| 5,297,032 A | 3/1994 | Trojan et al. | ................. | 364/408 |
| 5,305,200 A | 4/1994 | Hartheimer et al. | ......... | 364/408 |
| 5,497,317 A | 3/1996 | Hawkins et al. | ............. | 364/408 |
| 5,774,880 A | 6/1998 | Ginsberg | | |
| 5,784,696 A * | 7/1998 | Melnikoff | .................. | 705/36 R |
| 5,806,048 A | 9/1998 | Kiron et al. | .................... | 705/36 |
| 5,812,987 A | 9/1998 | Luskin et al. | .................. | 705/36 |
| 5,819,237 A | 10/1998 | Garman | ........................ | 705/36 |
| 5,819,238 A | 10/1998 | Fernholz | ....................... | 705/36 |
| 5,857,176 A * | 1/1999 | Ginsberg | .................. | 705/36 R |
| 5,924,082 A | 7/1999 | Silverman et al. | | |
| 5,924,083 A | 7/1999 | Silverman et al. | | |
| 5,940,809 A | 8/1999 | Musmanno et al. | ........... | 705/35 |
| 5,950,176 A | 9/1999 | Keiser et al. | | |
| 5,999,918 A | 12/1999 | Williams et al. | ............... | 705/36 |
| 6,029,146 A | 2/2000 | Hawkins et al. | ................ | 705/35 |
| 6,088,685 A | 7/2000 | Kiron et al. | .................... | 705/36 |
| 6,105,005 A | 8/2000 | Fuhrer | ......................... | 705/35 |
| 6,134,535 A | 10/2000 | Belzberg | ....................... | 705/37 |
| 6,134,600 A | 10/2000 | Liu | ............................... | 709/316 |
| 6,230,201 B1 | 5/2001 | Guck et al. | .................. | 709/228 |
| 6,293,409 B1 * | 9/2001 | Aykin | .......................... | 209/702 |
| 6,347,307 B1 | 2/2002 | Sandhu et al. | ................. | 705/35 |
| 6,360,210 B1 | 3/2002 | Wallman | ...................... | 705/36 |
| 6,393,409 B2 * | 5/2002 | Young et al. | ................... | 705/37 |
| 6,408,282 B1 * | 6/2002 | Buist | ......................... | 705/36 R |
| 6,484,151 B1 * | 11/2002 | O'Shaughnessy | ......... | 705/36 R |
| 6,493,682 B1 | 12/2002 | Horrigan et al. | ............... | 705/36 |
| 6,520,409 B1 | 2/2003 | Mori et al. | .................... | 235/380 |
| 6,709,330 B1 * | 3/2004 | Klein et al. | ..................... | 463/9 |
| 6,801,199 B1 * | 10/2004 | Wallman | ..................... | 345/440 |
| 6,839,686 B1 * | 1/2005 | Galant | ....................... | 705/36 R |

(Continued)

*Primary Examiner*—Jagdish N Patel
*Assistant Examiner*—Kenneth L Bartley
(74) *Attorney, Agent, or Firm*—Scott D. Wofsy; George N. Chaclas; Edwards Angell Palmer & Dodge LLP

(57) ABSTRACT

A system and method for analyzing and effectuating a transaction involving financial instruments which includes an analytics platform capable of modeling the performance of a financial instrument under user-defined conditions integrated for data sharing with a trading platform for executing a transaction involving the analyzed financial instrument.

8 Claims, 11 Drawing Sheets

U.S. PATENT DOCUMENTS

2002/0138383 A1* 9/2002 Rhee ............................ 705/36
2002/0152151 A1* 10/2002 Baughman et al. ............ 705/36
2002/0174045 A1* 11/2002 Arena et al. ................... 705/36

* cited by examiner

FIG. 10

| Calc | Face | Asset ID | Description | Pricing Method | | Price | Settlement Date | Status |
|---|---|---|---|---|---|---|---|---|
| ☑ | -2,000 | 9128276Y3 | TRESURY NOTE 4.25... | | | 100.59375 | 05/24/2002 | |
| ☑ | 10,000 | FN060030K | FNMA 30YR 1999 PRO... | | | 97.50250 | 02/06/2002 | |
| ☑ | 10,000 | BOA00PQ95 | 5.75 PUT 1X10 5.75 10... | 20.0V | | | 05/28/2002 | |
| ☑ | 10,000 | GN073230K | GNMA 30YR 1999 PR... | | | 103.09375 | 02/06/2002 | |
| ☑ | -3,000 | 9120276X5 | TRESURY NOTE 4.62... | | | 100.03125 | 05/24/2002 | |
| ☑ | 1,000 | GN080030L | GNMA 30YR 2000 PR... | | | 104.00000 | 02/06/2002 | |
| ☑ | -5,000 | FN070030K | FNMA 30YR 1999 PRO... | | | 101.40625 | 02/06/2002 | |
| ☑ | -5,000 | XS00050A0 | M:5Y S:0 GENERIC | 13.0V | | | 05/28/2002 | |
| ☑ | 1,000 | GN083230K | GNMA 30YR 1999 PR... | | | 104.78125 | 02/06/2002 | |
| ☑ | 5,000 | FN080030L | FNMA 30YR 2000 PRO... | | | 103.68750 | 02/06/2002 | |
| ☑ | -2,000 | 9128276T4 | TRESURY NOTE 5.0... | | | 98.98438 | 05/24/2002 | |
| ☑ | 1,000 | GN063230K | GNMA 30YR 1999 PR... | | | 100.03125 | 02/06/2002 | |

SYSTEM AND METHOD FOR TRADE ENTRY

CROSS-REFERENCE TO RELATED APPLICATION

The subject application claims the benefit of priority to U.S. Provisional Application Ser. No. 60/297,519, filed Jun. 12, 2001, the disclosure of which is herein incorporated by reference in its entirety.

BACKGROUND OF THE INVENTION

1. Field of the Invention

The subject disclosure is directed to a system and method for effectuating a transaction involving financial instruments such as fixed income securities, and more particularly, to a system and method for conducting a risk analysis on a fixed income security and subsequently initiating a trade of that security.

2. Background of the Related Art

Portfolio managers typically conduct various complex analyses prior to engaging in a transaction (also referred to as a "trade") involving financial instruments for the portfolios in their care. The term "portfolio managers" as used herein generally refers to the agents that have the authority to buy or sell financial instruments for one or more portfolios of financial instruments owned by others.

The analyses are primarily directed towards risk management of the portfolio, which includes generating hypothetical models of various transactions involving financial instruments prior to actualization. For portfolio managers, the task of understanding a wide range of financial instruments and efficiently managing multiple portfolios against numerous benchmarks in a risk controlled fashion demands significant resources and expertise. It is an established sound investment practice to minimize risk and maximize return by maintaining a portfolio of diverse assets of different type and class. Thus, attractive opportunities among all assets must always be sought, and also, carefully investigated prior to their purchase.

Typically, the analyses involve user-specified variables entered through a Graphical User Interface (GUI). The results are used by the portfolio manager to make investment decisions and/or develop investing strategies. Thereafter, the portfolio manager must transact (i.e., buy or sell) the desired financial instruments. This may also involve entering information in a GUI. The process becomes time intensive and cumbersome when the portfolio manager has to use different computer programs (e.g., transferring from a risk analysis program to a program for facilitating trades via the world wide web) to re-enter information regarding portfolios and financial instruments previously analyzed. It is further complicated in that many transactions are applied across multiple portfolios at once. Furthermore, the portfolios must be updated to reflect the transaction. Often, the volume of transactions involving different financial instruments within any given day may be extremely high. There may be thousands of trades affecting thousands of portfolios under the portfolio manager's care.

Accordingly, there is a need in the art for a system that provides analytical capabilities and the ability to conduct transactions for multiple portfolios of diverse financial instruments, such as fixed income securities and derivatives, in a more integrated and efficient manner.

SUMMARY OF THE DISCLOSURE

The present disclosure provides a system and method for conducting an analysis involving a financial instrument and engaging in a transaction involving that financial instrument with seamless integration of pertinent data. In addition, the aforementioned system and method may share data with, and incorporate for purposes of the analysis and/or transaction, a portfolio database containing information regarding existing portfolios of financial instruments under the care of the portfolio manager.

In one aspect, the present disclosure is directed to methods for analyzing and effectuating transactions involving financial instruments. An embodiment in accordance with the present disclosure may include the following steps: selecting a financial instrument; selecting a portfolio containing a plurality of financial instruments; conducting an analysis to model the effects on the selected portfolio of a hypothetical transaction involving the selected financial instrument and selected portfolio under user-defined conditions; and actualizing the hypothetical transaction by activating an actuator displayed in a graphical user interface.

Alternatively, another embodiment in accordance with the present disclosure may have steps which include: selecting a financial instrument; conducting an analysis to model the market performance of the financial instrument under user-defined conditions; effectuating a transaction involving the selected financial instrument by activating an actuator displayed in a graphical user interface; and selecting a portfolio of financial instruments to be involved in the transaction for receiving the selected financial instrument.

In one aspect, a method in accordance with the present disclosure, such as the aforementioned methods, may further include the step of receiving information relating to the selected portfolio and financial instruments contained therein from a portfolio database, and receiving financial data relating to the selected financial instrument from a server associated with the world wide web.

In another aspect, a method in accordance with the present disclosure, such as the aforementioned methods, may further include the step of selecting the conditions for the analysis and/or displaying the results of the analysis using a graphical user interface.

The present disclosure is also directed to a system for analyzing and effectuating transactions involving financial instruments. In one embodiment, a system in accordance with the present disclosure may include means for selecting a financial instrument, means for selecting a portfolio containing a plurality of financial instruments, means for conducting an analysis to model the effects on the selected portfolio of a hypothetical transaction involving the selected financial instrument and selected portfolio under user-defined conditions, and means for actualizing the hypothetical transaction. In one aspect, the means for actualizing the hypothetical transaction is an actuator displayed in a graphical user interface.

In another embodiment, a system in accordance with the present disclosure may include a portfolio database including portfolios of financial instruments, means for selecting a financial instrument, means for conducting analyses to model the market performance of the selected financial instrument under user-defined conditions, and means for effectuating a transaction involving the selected financial instrument and a portfolio in the portfolio database. In one aspect, the means for effectuating the hypothetical transaction is an actuator displayed in a graphical user interface.

In systems constructed in accordance with the present disclosure, such as the aforementioned systems, the means for selecting financial instruments and/or portfolios may be a graphical user interface while the means for conducting an analysis may be a data processing device.

The present disclosure is also directed to a computer-based system that includes an analytics platform (also referred to as an Analytical Server or "ANSER™") adapted and configured to perform risk analysis on a fixed income security, a trading platform (also referred to as a Trade Entry System or "TES™") adapted and configured to execute a transaction involving a fixed income security, and means for transferring data relating to a fixed income security analyzed by the analytics platform to the trading platform to execute a transaction thereof.

The aforementioned system may further include a portfolio database of existing portfolios made up of fixed income securities. In this embodiment, the risk analysis can be performed on a portfolio from the portfolio database along with a fixed income security.

The data transferred in the aforementioned system may include an alphanumeric identifier for the fixed income security or portfolio, the price of the security, security characteristic, risk or compliance-related information.

These and other unique features of the system and method disclosed herein will become more readily apparent from the following description of the drawings.

BRIEF DESCRIPTION OF THE FIGURES

So that those having ordinary skill in the art to which the subject invention pertains will more readily understand how to make and use the system and method of the subject disclosure, embodiments thereof will be described in detail hereinbelow with reference to the figures, wherein:

FIG. 10 is an example of a graphical user interface for loading and viewing portfolios of financial instruments and related information in accordance with the present disclosure.

DETAILED DESCRIPTION OF THE PREFERRED EMBODIMENTS

The subject disclosure is directed to a new and useful risk management and trade entry tool in the form of a computer system configured to provide intra-day and inter-day real-time relative value analysis and trades for multiple portfolios of diverse fixed income securities and derivatives. It is understood that its use in conjunction with fixed income securities is exemplary of the type of financial product and circumstance for which the present disclosure is well suited. Those skilled in the art will readily appreciate that a system in accordance with the subject disclosure may be used in conjunction with other financial instruments or products as well.

Those skilled in the art will also readily appreciate that a system in accordance with the present disclosure includes the various computer and network related software and hardware used in a distributed computing network, that is, programs, operating systems, memory storage devices, input/output devices, data processors, servers with links to data communication systems, wireless or otherwise, such as those which take the form of a local or wide area network, and a plurality of data transceiving terminals within the network, such as personal computers. Those skilled in the art will further appreciate that, so long as its users are provided local and remote access to a system in accordance with the present disclosure, the precise type of network and associated hardware are not vital to its full implementation.

Figure 1:
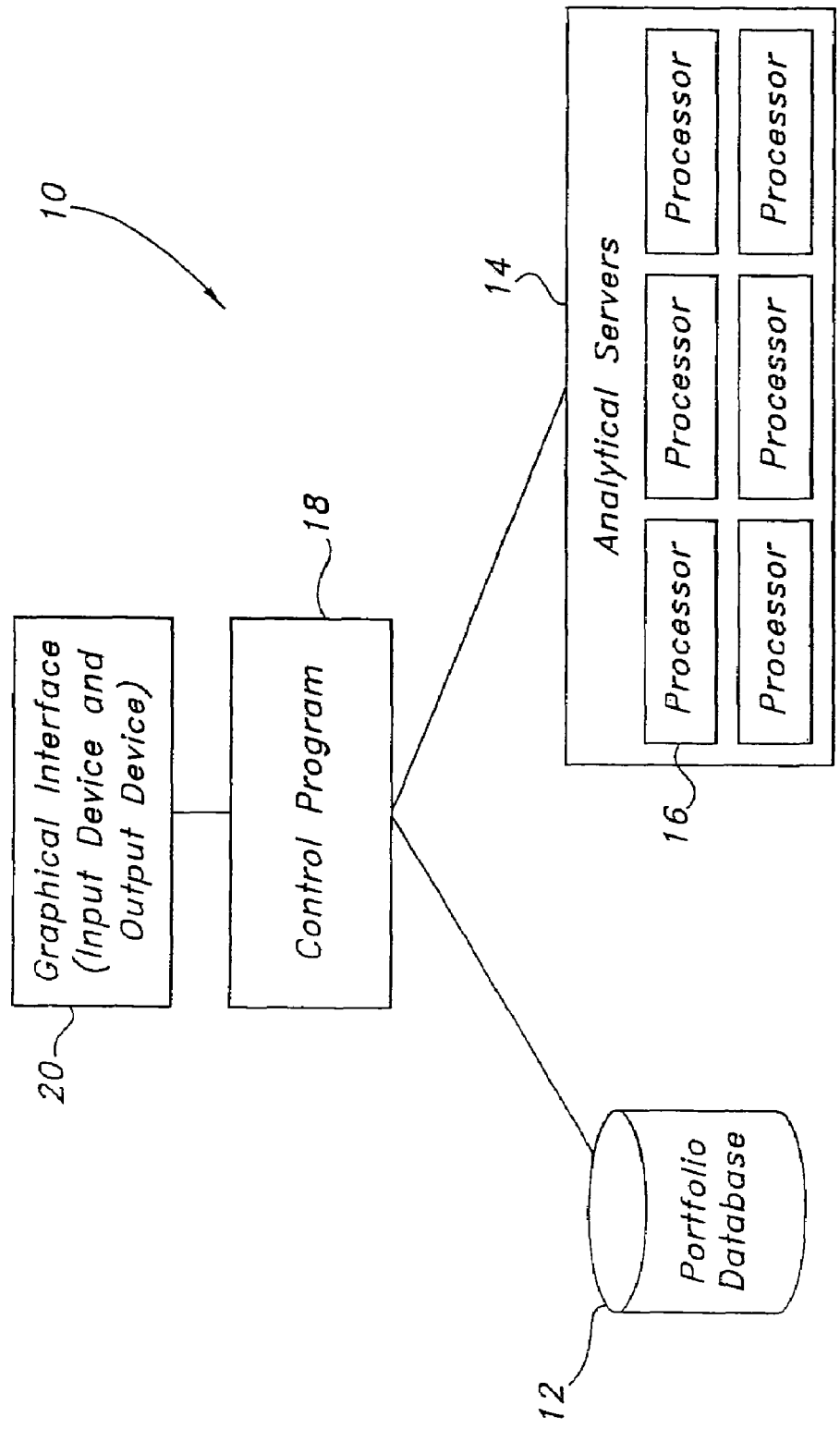
FIG. 1 is a schematic diagram depicting the core functional components of a computer-based system for implementing a system and method of the present disclosure.

Referring now to the drawings wherein there is a schematic representation illustrated in FIG. 1 of the core functional components of the computer-based trade entry system of the subject disclosure designated generally by reference numeral 10. The trade entry system 10 is adapted and configured to facilitate interaction between an analytics platform and a trading platform. In particular, the system facilitates a trade of a previously analyzed fixed income security with a single, user-controlled action. More particularly, the system of the subject disclosure enables a user, through a graphical user interface, to selectively analyze a fixed income security under hypothetical market conditions (e.g., typically to model its future performance and effect on a portfolio of fixed income securities as if it were traded for and added thereto) and enter a trade for that fixed income security to one or more portfolios via a single on-screen actuator, through keyboard or a computer peripheral device such as a mouse. System 10 is intended for use by, among others, portfolio managers, agents, custodians and investors involved in the buying and selling of fixed income securities.

Figure 11:
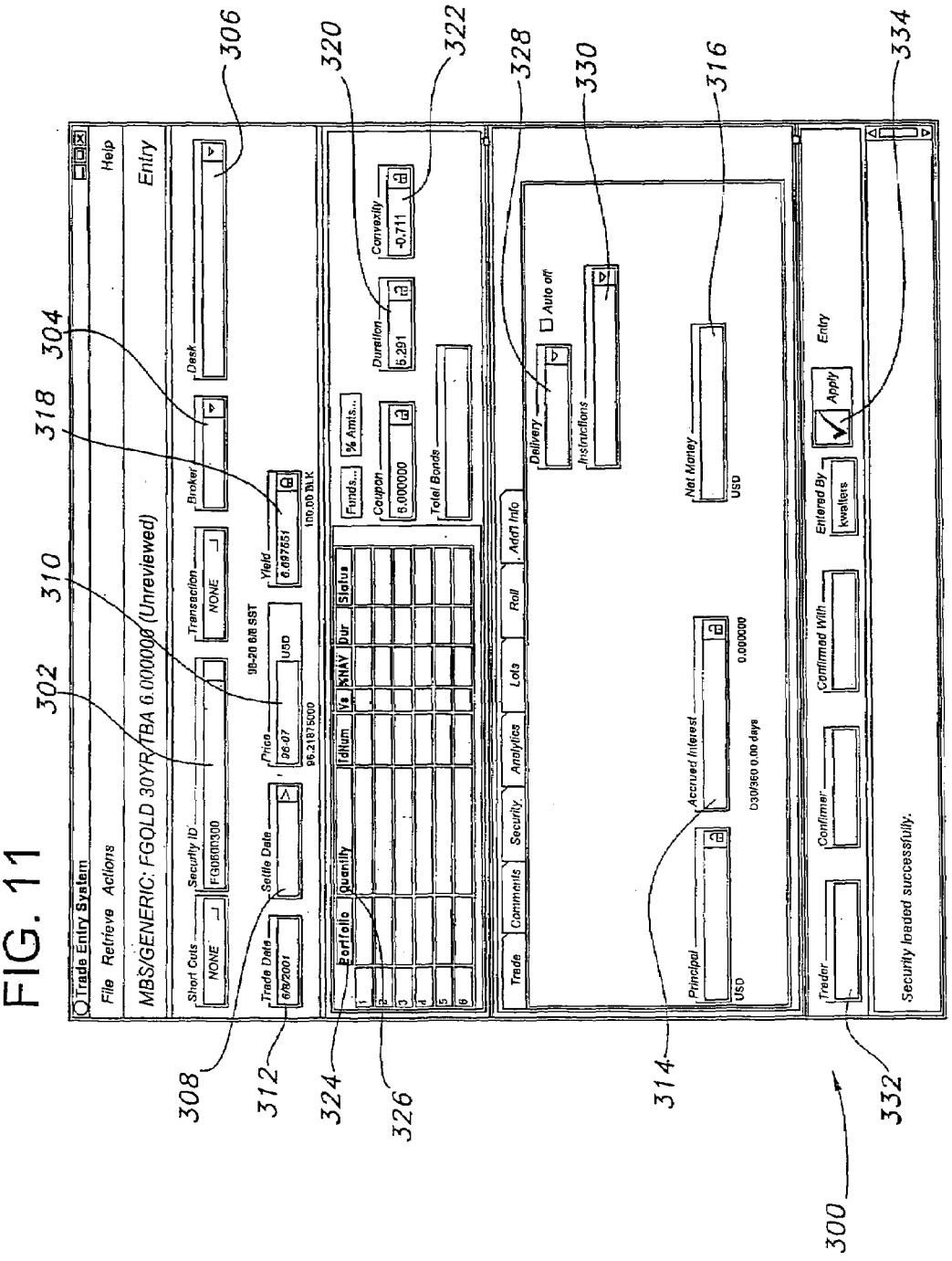
FIG. 11 is an example of a main graphical user interface for a trading platform in accordance with the present disclosure which may be used by the portfolio manager to effectuate a transaction involving the subject financial instrument in the analyses.

Preferably, the graphical user interfaces (also referred to as "screens") used by system 10 incorporate user-friendly features and fit seamlessly with other operating system interfaces, that is, in a framed form having borders, multiple folders, toolbars with pull-down menus, embedded links to other screens and various other selectable features associated with animated graphical representations of depressible buttons. These features can be selected (i.e., "clicked on") by the user via connected mouse, keyboard, voice command or other commonly used tool for indicating a preference in a computerized graphical interface. FIGS. 2-11, which are discussed in detail below, illustrate exemplary graphical user interfaces for use the system and method of the subject disclosure. The analytics platform of system 10 is generally represented by FIGS. 2-10 while the trading platform is represented by FIG. 11.

Referring to FIG. 1, trade entry system 10 is associated with a data storage device or memory 12 and an analytical server 14 having a processor 16 which is operatively associated with the memory 12 via control program 18 for managing the flow of data throughput. Alternatively, and as shown in the embodiment of the present disclosure depicted in FIG. 1, a plurality of analytical servers 14 and processors 16 can be associated with memory 12 and control program 18. Data input and output devices, collectively referred to as graphical interface 20, are operatively associated with the memory 12 and processors 16 for receiving data and instructions and reporting information through control program 18.

Memory 12 further contains a portfolio database storing a plurality of investment portfolios owned by individual or institutional investors. Each portfolio includes a plurality of investment products in the form of fixed income securities such as U.S. Treasury notes or bonds, municipal, corporate or agency bonds, mortgage backed securities or derivative instruments. Program 18 contains an instruction set written in a conventional computing language such as HTML, C++ or Java, for coordinating the interactive relationship between memory 12, processors 16, and graphical interface 20.

Program 18 and processors 16 enable system 10 to provide inter-day and intra-day computations and real-time market data useful for conducting various types of analyses involving fixed income securities and the portfolios in the portfolio database stored in memory 12, per instructions received from graphical interface 20. Preferably, system 10 is operatively associated with the world wide web and configured such that graphical interface 20 may send and receive data over the world wide web. System 10 allows a portfolio manager to change underlying assumptions, relating to, among other things, measures useful for modeling performance of financial instruments and making risk management decisions for a portfolio of financial instruments under various economic conditions.

Figure 2:
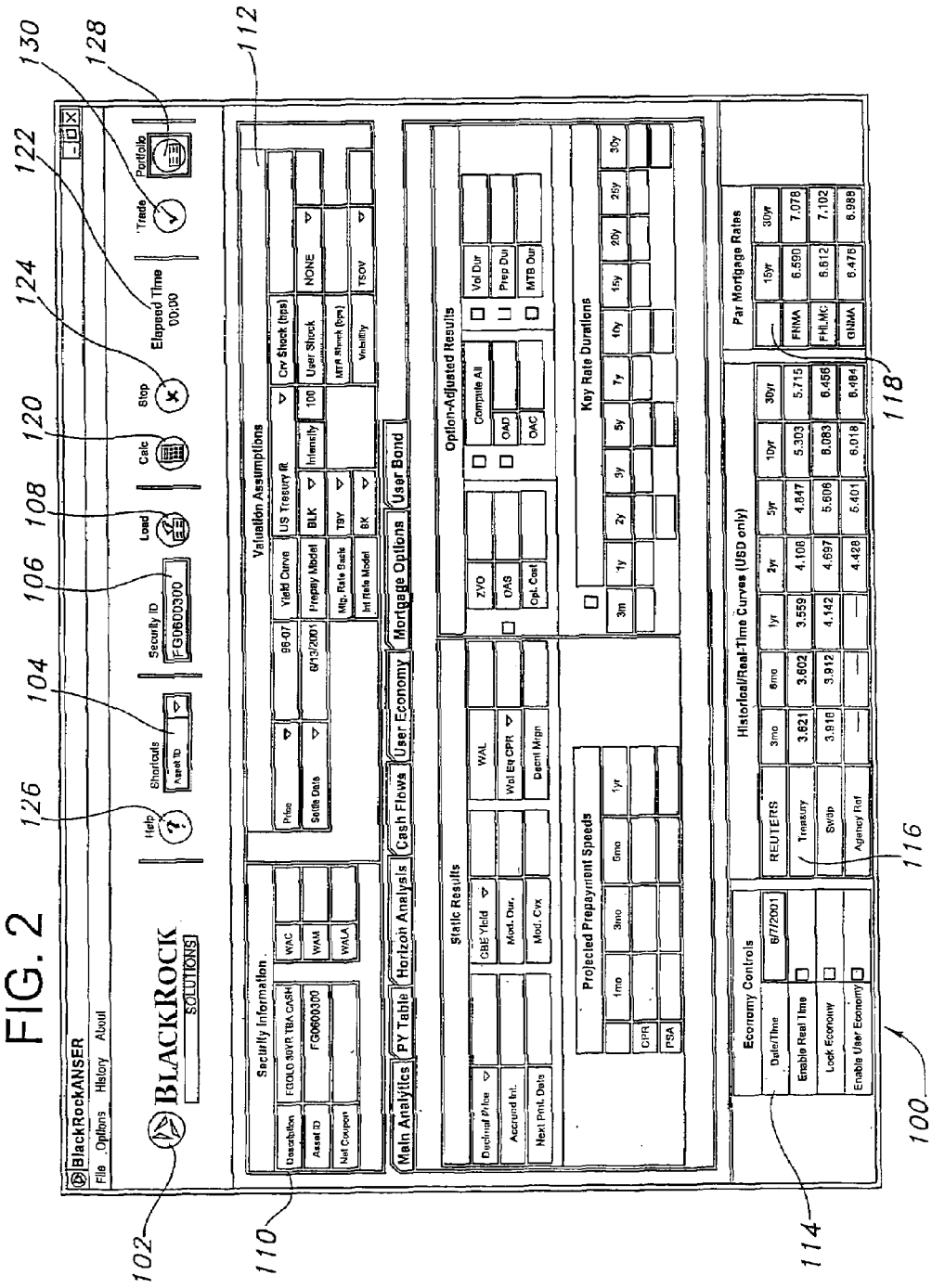
FIG. 2 is an example of a main graphical user interface for an analytics platform of a system in accordance with the present disclosure.
Figure 3:
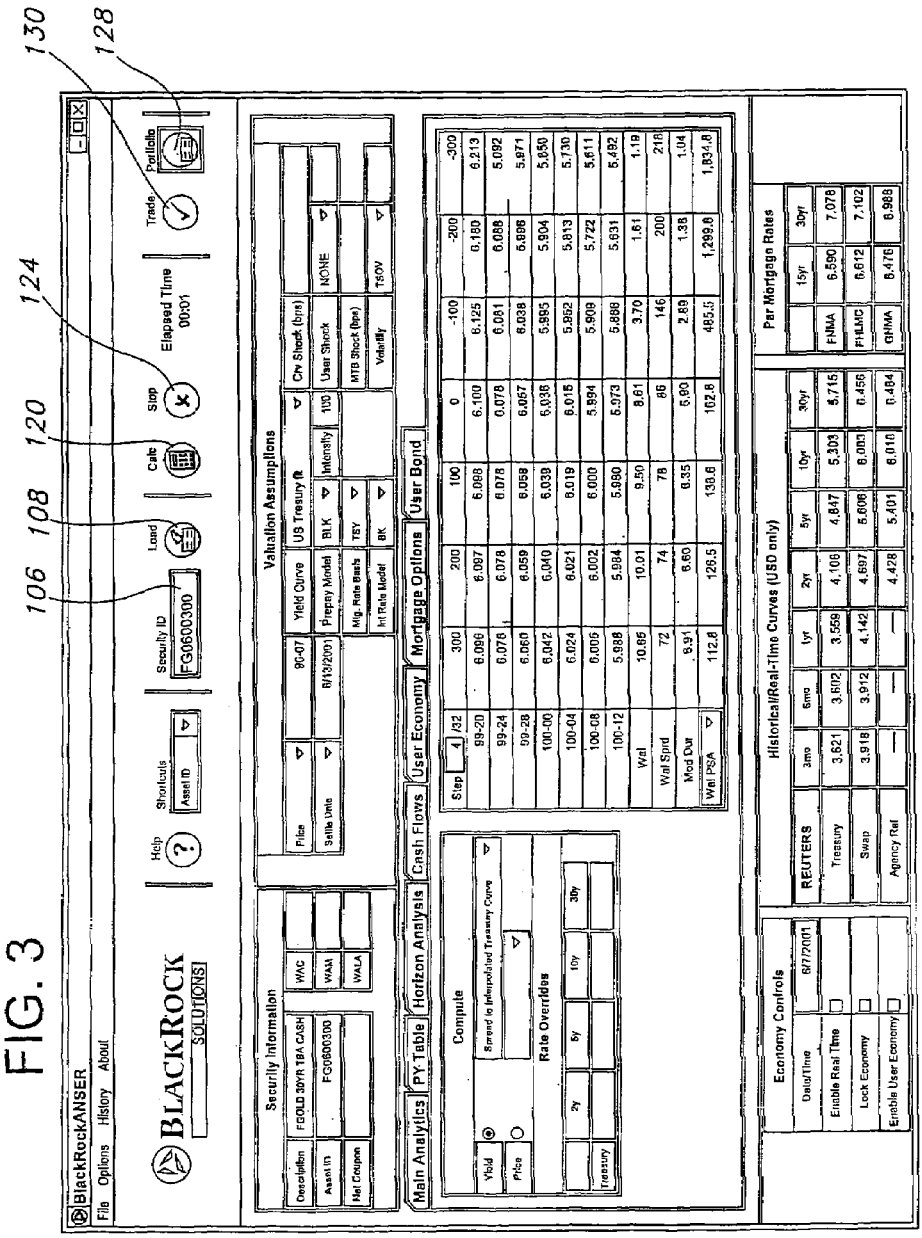
FIG. 3 is another view of the graphical user interface of FIG. 2 illustrating a first screen including various pre-analysis settings in accordance with the present disclosure.
Figure 4:
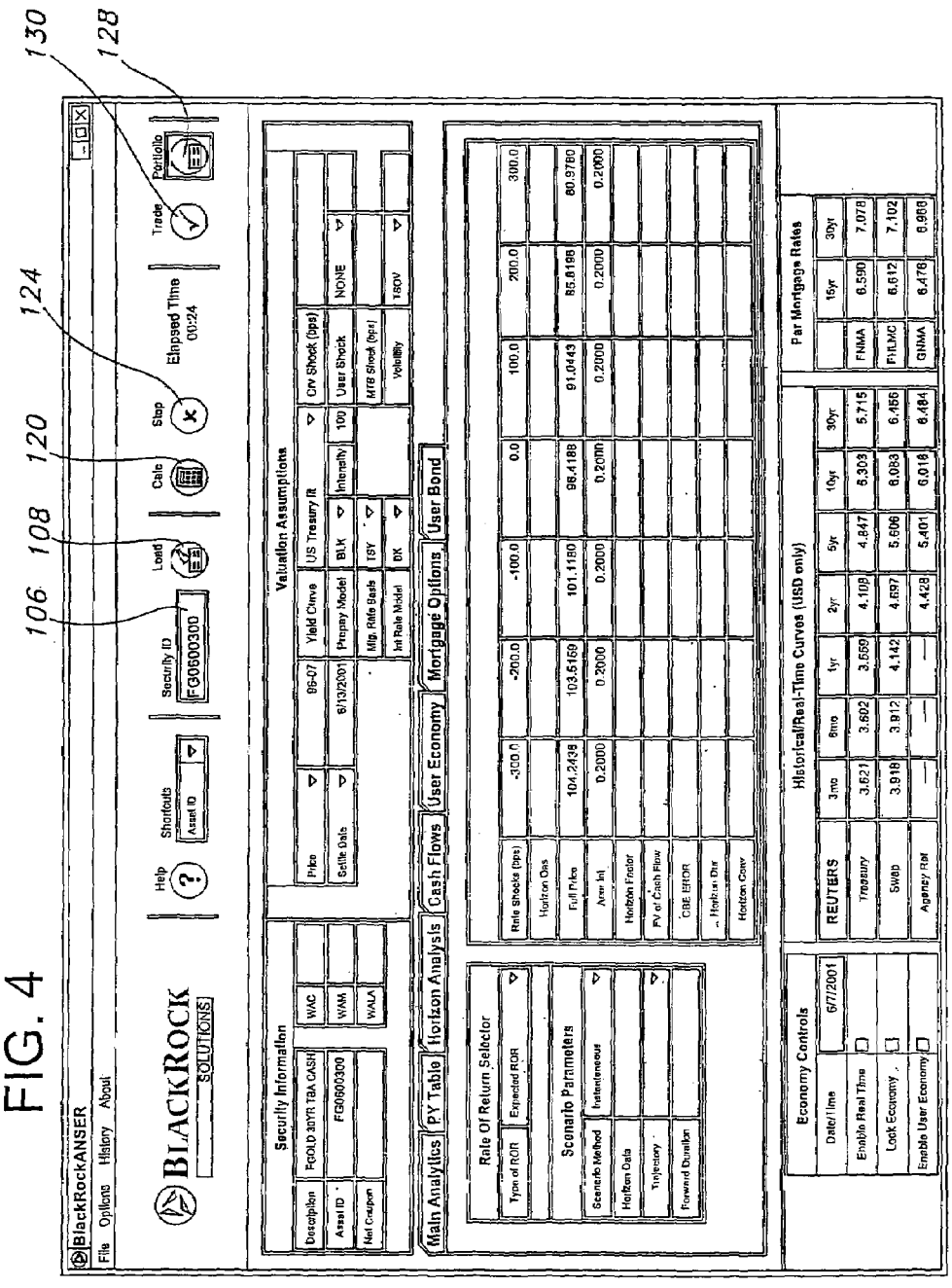
FIG. 4 is another view of the graphical user interface of FIG. 2 illustrating a second screen including various pre-analysis settings in accordance with the present disclosure.
Figure 5:
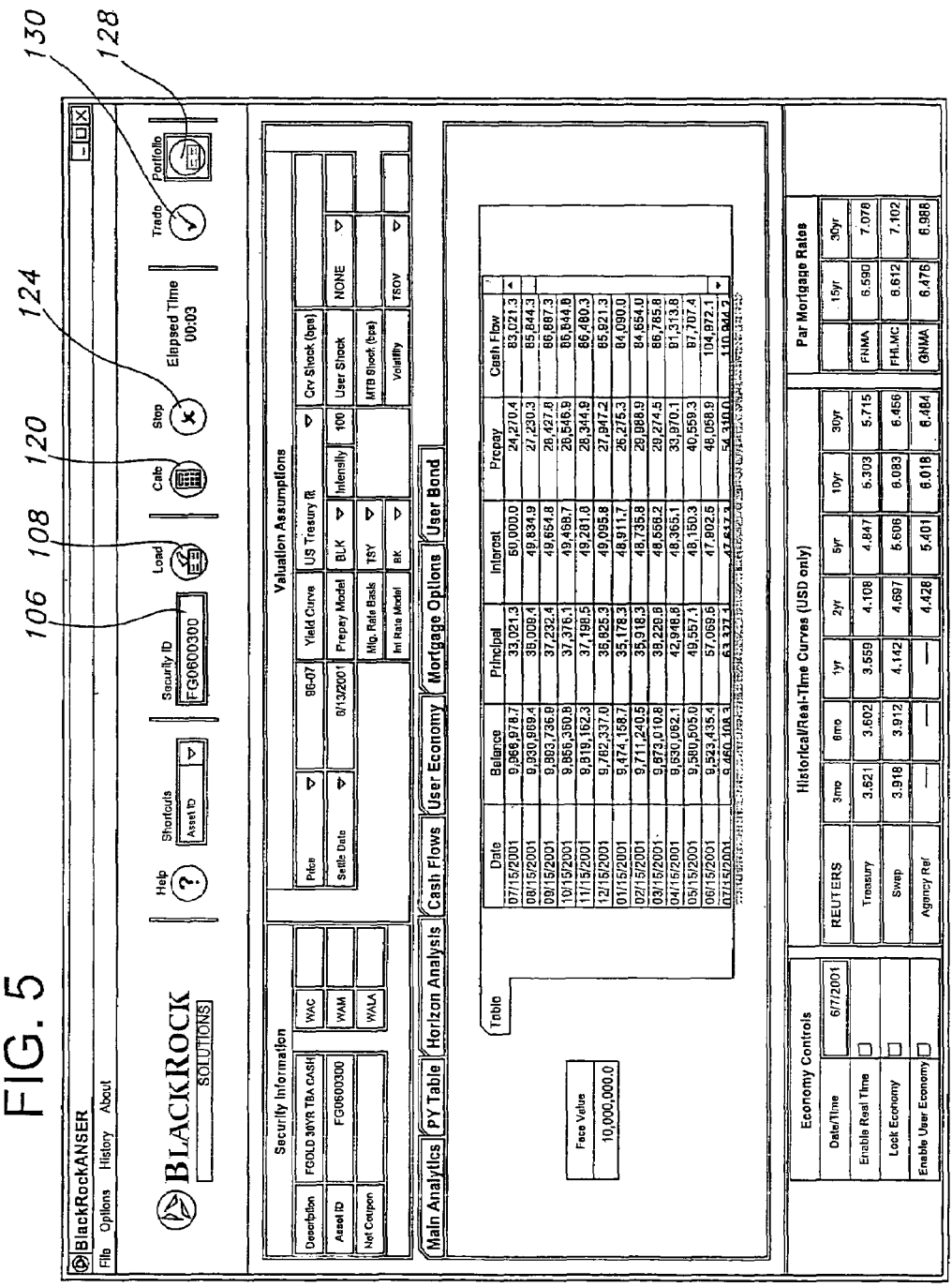
FIG. 5 is another view of the graphical user interface of FIG. 2 illustrating a third screen including various pre-analysis settings in accordance with the present disclosure.
Figure 6:
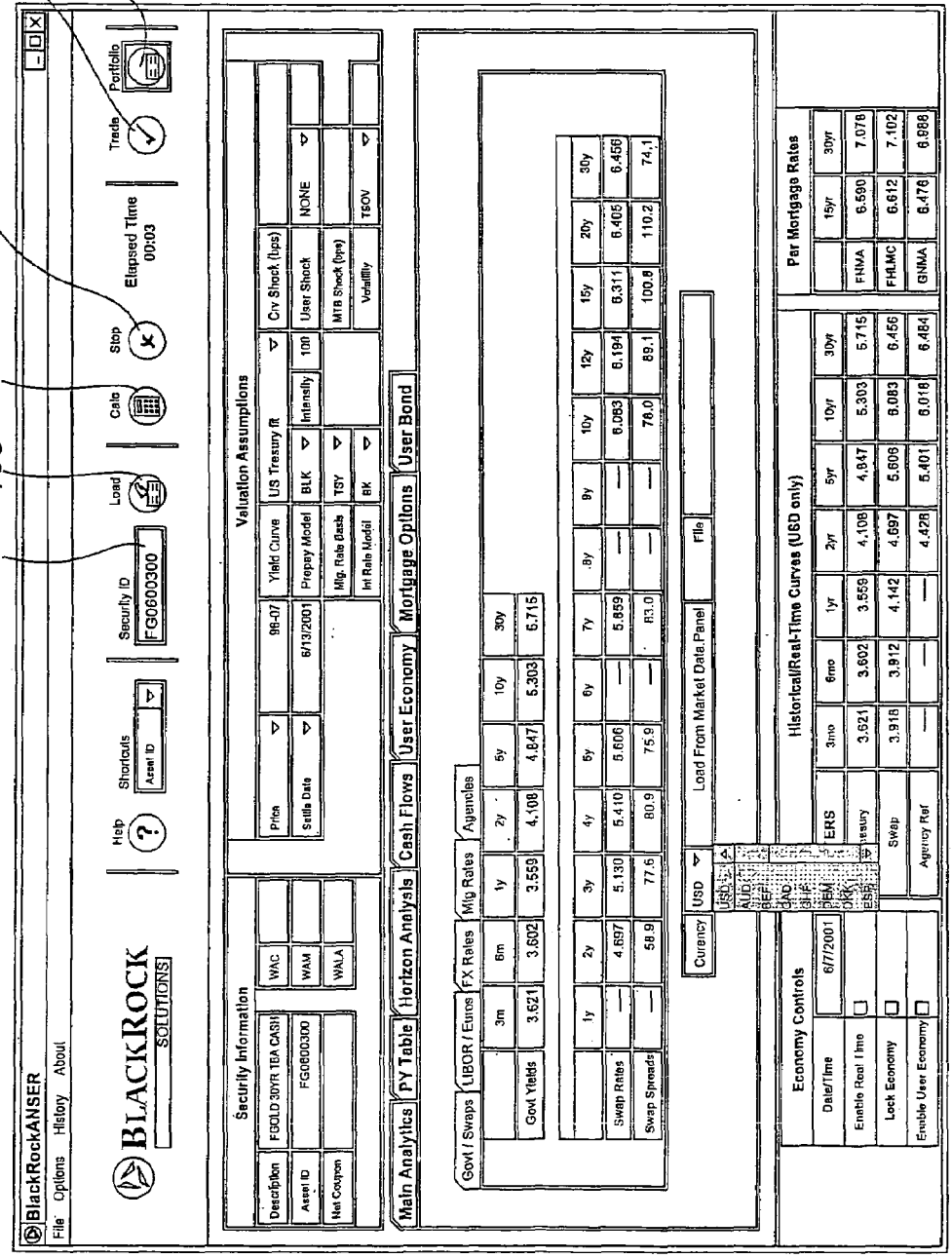
FIG. 6 is another view of the graphical user interface of FIG. 2 illustrating a fourth screen including various pre-analysis settings in accordance with the present disclosure.
Figure 7:
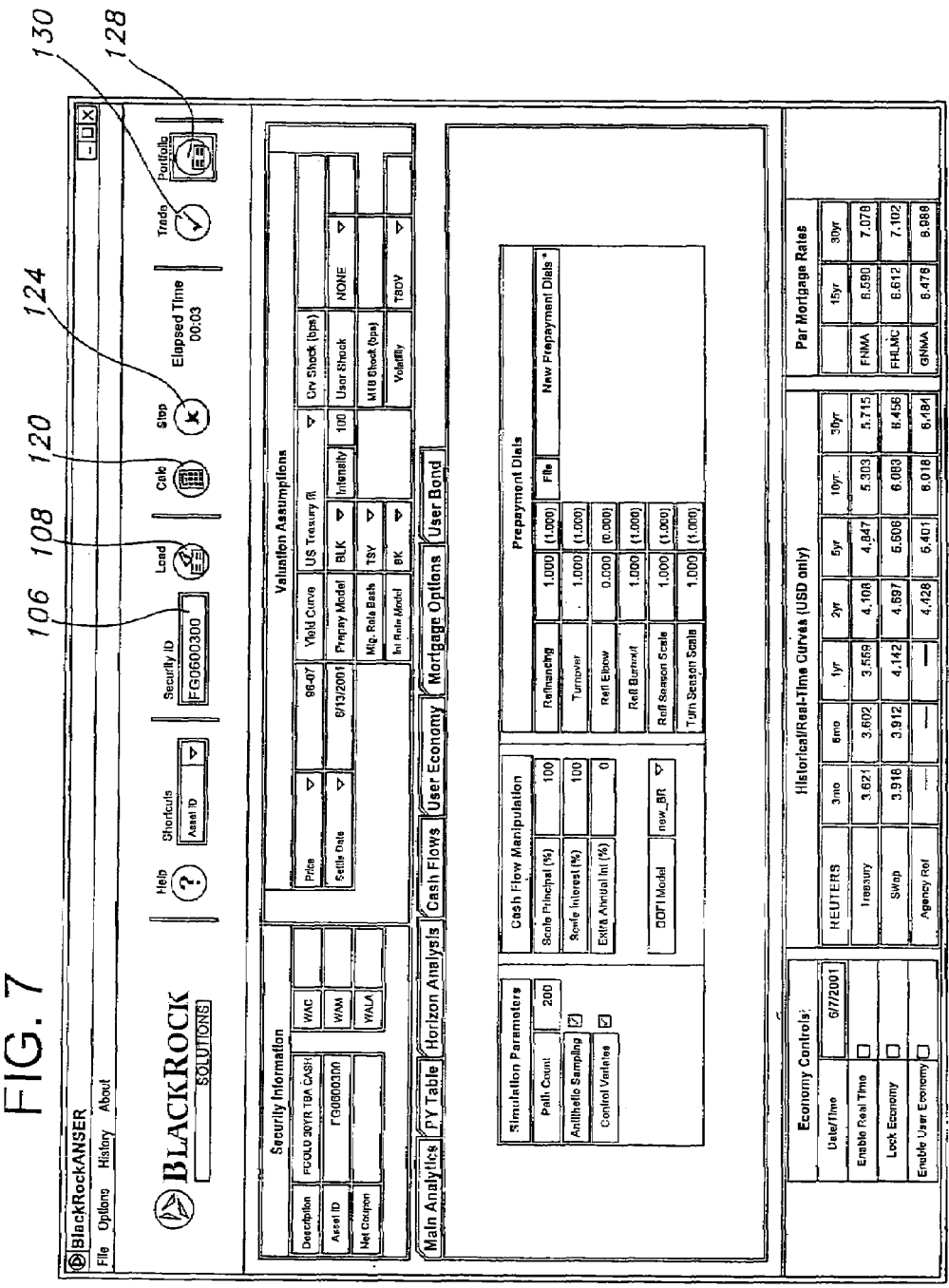
FIG. 7 is another view of the graphical user interface of FIG. 2 illustrating a fifth screen including various pre-analysis settings in accordance with the present disclosure.
Figure 8:
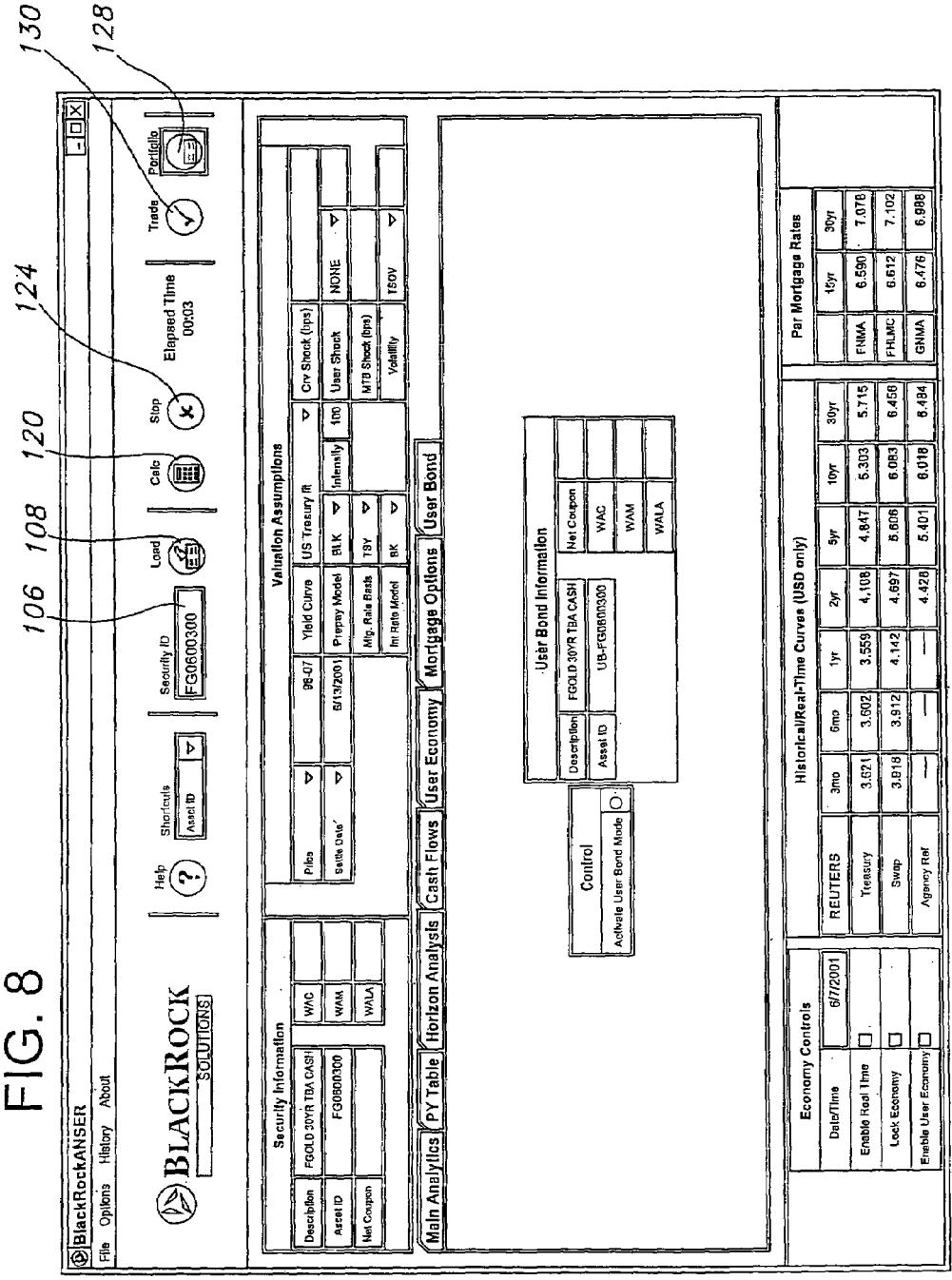
FIG. 8 is another view of the graphical user interface of FIG. 2 illustrating a sixth screen including various pre-analysis settings in accordance with the present disclosure.

Referring to FIG. 2, there is illustrated a display screen defining the graphical user interface 100. Interface 100 includes a border portion 102 having pull-down shortcut menu 104 and security identification entry field 106. Shortcut menu 104 illustrates the multiple security identifier formats that can be used for quick retrieval of security information. Border portion 102 may also contain a trademark or company symbol or name, such as "BlackRock Solutions" as shown. All fixed-income securities may be identified by an alphanumeric code or asset identification, such as the Committee on Uniform Security Identification Procedures (CUSIP) number, which can be entered directly into field 106. For example, the code shown in field 106 (i.e., "FG0600300") identifies a "Freddie Mac Gold 30 Year TBA Coupon. By clicking on load button 108, information corresponding to the security identified in field 106 is loaded into security information table 110. Valuation assumptions in table 112 and economy controls 114, which relates to the historical/real-time curves in table 116 and par mortgage rates in table 118, may be used to simulate various conditions depending on the purposes of the analysis. Preferably, all default values for parameters shown in screen 100 change to correspond with the most common values for the particular type of security identified in field 106.

Interface 100 is configured to allow access to the various other screens shown in FIGS. 3-8 by clicking on graphical representations of folder tabs. Each folder tab contains a title which is indicative of the information displayed when the respective tab is clicked on. In FIG. 2, the "Main Analytics" folder is displayed. FIGS. 3-8 illustrate the "PY Table", "Horizon Analysis", "Cash Flows", "User Economy", "Mortgage Options" and "User Bond" screens 100A through 100F, respectively. Each screen 100A-F provides adjustable options (e.g., yield curves, economic data and prepayment models, etc.) and information relating to the analyses which may be conducted using system 10.

As illustrated in FIGS. 2-9, border portion 102, among other things, is included in all screens. In addition to the previously mentioned features, border portion 102 also includes a calculation button 120, timer 122, stop button 124, help button 126, portfolio button 128 and trade button 130. Thus, the features provided in border portion 102 may be accessed in any of system 10 screens. The analyses can be actuated by clicking on calculation button 120, which activates timer 122. The analyses may be stopped any time after actuation by button 124. Help button 126 provides interactive guidance for using the system 10. Portfolio button 128 provides access to portfolio information kept in portfolio database 24 for conducting analyses on the portfolios of fixed-income securities stored therein.

FIG. 10 illustrates a screen 200 which provides portfolio information for a sample portfolio of securities in a plurality of data fields hereinafter referred to as table 202. Table 202 includes information for each security in the portfolio such as its price, amount, asset identification, description, and settlement data, among other things. Screen 200 permits the user to select a portfolio of instruments to be involved in the analyses conducted by system 10, along with the security entered in field 106 in FIG. 1. Assets in the selected portfolio may otherwise be excluded from the calculations by clicking on the calculation field associated with each asset in table 202. Furthermore, various settings may be changed for each security or globally for the selected portfolio.

Figure 9:
FIG. 9 illustrates the main graphical user interface shown in FIG. 2 after conducting various analyses in accordance with the present disclosure.

Screen 100G in FIG. 9 illustrates the "Main Analytics" folder after analyses have been completed or halted via stop button 124. Elapsed time 122 is shown as 1:16 minutes. As will be readily apparent by comparison of FIGS. 2. and 9, the results of the analyses are separated into static measures 132 (e.g., price/yield tables, spread pricing, modified duration and modified convexity), option adjusted measures 134 (e.g., option-adjusted spread, option adjusted duration and option adjusted convexity), key rate durations 136 and projected prepayment speeds 138.

Trade button 130 can be clicked on at any time from any screen shown in FIGS. 2-10. Clicking trade button 130 initiates a transfer of data from the analytics platform to the trading platform for effectuating a transaction involving the fixed income security shown in security identification field 106. In this embodiment, clicking trade button 130 opens trade entry screen 300 as shown in FIG. 11. Screen 300 has security identification field 302 which upon clicking trade button 130 is automatically filled with the same alphanumeric code shown in field 106. In addition, system 10 default settings can be adjusted so that other information may be automatically input into screen 300, if such information was already inputted in the analytics platform of system 10. For example, portfolio information used for purposes of analyzing a hypothetical transaction can be automatically transferred to screen 300. Information regarding the broker 304 (which may be an alphanumeric identifier), trading desk 306 (i.e., user or salesperson identification primarily for use in an institutional setting) and settlement date 308 (which defaults to common convention based on security type) are entered into corresponding fields. The security price contained in field 310 is automatically filled based on the trade date shown in field 312. Accrued interest 314, net money 316 and trade yield 318 are computed automatically. Duration and convexity fields 320 and 322, respectively, are supplied with information from the analyses or defaults to the previous end of day amounts.

To consummate the trade, the portfolio involved is identified, preferably by alphanumeric code, in the portfolio column fields 324, if not already automatically identified. As previously mentioned, a portfolio which has been selected via portfolio screen 200 may be automatically input into fields 324. Securities may be purchased for more than one portfolio via interface 300. The quantity of securities involved in each trade to each portfolio is designated in field 326. Delivery options and instructions may be set in fields 328 and 330, respectively. The trade is finalized by entering initials in trader field 332, which serves as an electronic signature, and then clicking on apply button 334.

The analysis and trading platforms of system 10 are preferably fully integrated in that they share a single database and data seamlessly, which, among other things, eliminates the need for re-entering information, streamlines the analysis and trading process, and facilitates tracking capabilities based on inputted information and better management of stored information. Furthermore, the integrated platforms of system 10 allow the portfolio managers to actualize a trading strategy based on the results of risk management studies using the analysis platform. For example, the analysis platform of system 10, as shown in FIGS. 2-10, can be used to create a hypothetical trade or portfolio strategy, simulate the strategy, measure and monitor the strategy, and attribute the returns to various risk factors. Depending on the results of the analyses, the trading strategy may be efficiently implemented across multiple portfolios using the integrated trading platform of system 10, as shown by screen 300 in FIG. 11.

The system and method of the subject disclosure provides a system and method for analyzing a fixed income security and effectuating a transaction involving that security. Although the preferred and exemplary embodiments of the present disclosure have been described with a full set of features, it is to be understood that the disclosed system and method may be practiced successfully without the incorporation of each of those features. It is to be further understood that modifications and variations may be utilized without departure from the spirit and scope of this inventive system and method, as those skilled in the art will readily understand. Such modifications and variations are considered to be within the purview and scope of the appended claims and their equivalents.

What is claimed is:

1. A method for analyzing and effectuating a transaction involving an individual fixed income security, comprising the steps of:
    a) accessing an analytics platform adapted and configured to perform an economic analysis on a selected individual fixed income security under user defined conditions to model the economic effects on a selected portfolio of a hypothetical future transaction involving the selected individual fixed income security and the selected portfolio, the platform including a plurality of adjustable options for conducting the economic analysis;
    b) inputting a plurality of adjustable options into the platform for conducting the economic analysis;
    c) selecting a proposed individual fixed income security for potential inclusion in at least one portfolio thereby creating a hypothetical transaction;
    d) selecting a plurality of portfolios from a group of portfolios under management from a portfolio database in operable communication with the analytics platform, each portfolio containing at least one existing individual fixed income security;
    e) conducting an economic analysis on the selected portfolios with the proposed individual fixed income security using at least one of the adjustable options on the analytics platform to determine effects of the hypothetical transaction on the selected portfolios;
    f) choosing a plurality of the selected portfolios for completing the hypothetical transaction;
    g) transferring information relating to the hypothetical transaction from the analytics platform to a trade entry system with a single action controlled by an agent, wherein the single action is selection of a trade button; and
    h) actualizing the hypothetical transaction across the plurality of portfolios as a result of step (g).

2. A method according to claim 1, further comprising the steps of (i) displaying the results of the analysis in a graphical user interface, wherein the results of the analysis include at least one of static measures, option adjusted measures, key rate durations and projected prepayment speeds, (j) receiving financial data relating to the selected individual fixed income security from a server associated with the world wide web, and (k) selecting the conditions for the economic analysis in a graphical user interface.

3. A method according to claim 2, wherein:
    a) the static measures include at least one of a price yield table, spread pricing, modified duration and modified convexity; and
    b) the option adjusted measures include at least one of an option adjusted spread, an option adjusted duration and option adjusted convexity.

4. A method according to claim 1, further comprising the step of displaying the results of the analysis in a graphical user interface.

5. The method of claim 1, wherein the individual fixed income security is chosen from the group consisting of a U.S. Treasury notes, bonds, mortgage backed securities and derivative instruments.

6. The method of claim 1, wherein the transaction is actualized by activating an actuator displayed in a graphical user interface 7. The method of claim 6, wherein the actuator is activated by an investment manager to actualize the transaction across the plurality of investor portfolios under management by the investment manager.

8. A method for analyzing and effectuating a transaction involving an individual fixed income security, comprising the steps of:
    a) accessing an analytics platform adapted and configured to perform an economic analysis on a selected individual fixed income security under user defined conditions to model the economic effects on a selected portfolio of a hypothetical future transaction involving the selected individual fixed income security and the selected portfolio, the platform including a plurality of adjustable options input thereto for conducting the economic analysis;
    b) selecting a proposed individual fixed income security for potential inclusion in at least one portfolio thereby creating a hypothetical transaction;
    c) selecting a plurality of portfolios from a group of portfolios under management from a portfolio database in operable communication with the analytics platform, each portfolio containing at least one existing individual fixed income security;

d) conducting an economic analysis on the selected portfolios with the proposed individual fixed income security using at least one of the adjustable options on the analytics platform to determine effects of the hypothetical transaction on the selected portfolios;

e) choosing a plurality of the selected portfolios for completing the hypothetical transaction; and f) transferring information relating to the hypothetical transaction from the analytics platform to a trade entry system by selection of a trade button controlled by an agent, wherein the information relating to the hypothetical transaction includes instructions for the trade entry system to complete the hypothetical transaction for the chosen portfolios.

\* \* \* \* \*